United States Patent
Collins et al.

(10) Patent No.: US 12,093,315 B2
(45) Date of Patent: Sep. 17, 2024

(54) ASSERTED RELATIONSHIPS MATCHING IN AN IDENTITY GRAPH DATA STRUCTURE

(71) Applicant: LiveRamp, Inc., San Francisco, CA (US)

(72) Inventors: W. Dwayne Collins, Conway, AR (US); Pavan Roy Marupally, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 18/035,059

(22) PCT Filed: Oct. 29, 2021

(86) PCT No.: PCT/US2021/057190
§ 371 (c)(1),
(2) Date: May 2, 2023

(87) PCT Pub. No.: WO2022/098564
PCT Pub. Date: May 12, 2022

(65) Prior Publication Data
US 2024/0012857 A1    Jan. 11, 2024

Related U.S. Application Data

(60) Provisional application No. 63/109,183, filed on Nov. 3, 2020.

(51) Int. Cl.
*G06F 16/901* (2019.01)
*G06F 16/28* (2019.01)

(52) U.S. Cl.
CPC ........ *G06F 16/9024* (2019.01); *G06F 16/288* (2019.01)

(58) Field of Classification Search
CPC .............. G06F 16/28–288; G06F 16/90–9027
See application file for complete search history.

(56) References Cited

U.S. PATENT DOCUMENTS

| | | | |
|---|---|---|---|
| 9,378,303 | B1 | 6/2016 | Shankar et al. |
| 2009/0198678 | A1 | 8/2009 | Conrad et al. |
| 2011/0066661 | A1 | 3/2011 | Sangal et al. |

(Continued)

OTHER PUBLICATIONS

Christen, et al., Context-Aware Approximate String Matching for Large-Scale Real-Time Entity Resolution, 2015 IEEE International Conference on Data Mining Workshop (ICDMW) (pp. 211-217) (Year: 2015).*

*Primary Examiner* — Robert W Beausoliel, Jr.
*Assistant Examiner* — Nirav K Khakhar

(57) ABSTRACT

An identity graph is partitioned into records pertaining to entities with similar data. A single authentication string or asserted relationship (AR) that represents a person identifies the person in the graph whose composite information is closest to the input by using all of the available context provided by the input string. By providing more contextual data to the match service than simply a name and single touchpoint, the service is able to match to a more focused and unique set of persons. In certain embodiments, the invention allows for the ability to take a small set of input data and more accurately identify its location in an identity graph much faster in time and lower in computational cost.

17 Claims, 3 Drawing Sheets

(56) References Cited

U.S. PATENT DOCUMENTS

2014/0344211 A1   11/2014  Allan et al.
2017/0017708 A1    1/2017  Fuchs et al.
2017/0220677 A1*  8/2017  Kazi ...................... H04L 67/53

* cited by examiner

ASSERTED RELATIONSHIPS MATCHING IN AN IDENTITY GRAPH DATA STRUCTURE

This application claims the benefit of U.S. provisional patent application no. 63/109,183, filed on Nov. 3, 2020. Such application is incorporated herein by reference in its entirety.

BACKGROUND

The process of entity resolution using an identity graph generally involves two sequential steps. The first step is the continual temporal construction of the identity graph itself. An identity graph describes the entities (persons, households, places, etc.) by means of labeled collections of data as well as the relationships between the different entity types. For example, persons are associated with one or more places, and households are subsets of persons with a designated place. In the graph data structure, nodes represent individual touchpoints related to persons such as a name or address, or persons themselves, or households, in various particular examples. The edges between the nodes connect related touchpoints, persons, and households. For example, edges may connect each touchpoint that relates to a particular person, and edges may similarly connect each person to an associated household for that person. The second step of entity resolution is taking an input string that asserts to describe a specific entity and identifying an entity within the graph that best matches with the input, if such an entity actually exists in the graph. This resolution is performed by traversing the graph.

The construction of the defensible data definition of persons requires the use of the largest available context provided by the authentication data used in the graph, because different persons can share a non-trivial amount of personally identifiable information (PII). For example, persons within a household unit may share a postal address, a phone number, an email address, etc. in their provided authentication strings. Also, each resulting defined person in the graph is usually made up of multiple different PII strings used by the person. This results because a person may often use different names or nicknames, postal addresses, phone numbers, emails, etc. simultaneously for different authentication strings. Once this graph is constructed, "resolution" can occur through an interface into the graph, commonly called the match service.

Historically, most users of such a system were interested only in the name and a single touchpoint instance of a person, such as a postal address, telephone number, email, etc. As a result, the match service is often constructed using only a name and single touchpoint instance PII, for reasons of time and cost efficiency. This relationship between a name and single touchpoint may be referred to as an "entity relation" or ER. The process of matching an input string using only a single embedded ER or other small subset of the input string to a person in the graph is done by a limited comparison of the restricted input with a single PII string in the graph. It may be seen then that there is a significant contextual disconnect between the framework used to construct the graph and the framework to interface with the graph.

As digital touchpoints (email addresses, telephone numbers, and the like) become more prominent and equal to non-digital touchpoints such as postal addresses, this disconnect has created significant ambiguity in terms of the process of identifying the best match in the graph to a particular ER. There can be multiple distinct persons that share common ERs. Therefore, if each of these persons are presented to the match service and a common ER is used for the match, then all of the results will return the same entity. This will occur even in the case that each such person is actually in the graph as distinct entities. Similarly, the PII that is included in the input string may not all appear in one of the PII strings that form the person of interest in the graph. There can be (and often are) multiple persons that have PII that match different subsets of the input string's information. Therefore, in order to get more accurate and defensible match results (i.e., each input in the previous examples results in a different person in the graph), much more context is needed in the matching interface's logical framework.

Prior approaches to this problem have involved the construction of very brittle business logic for specific cases, or the attempt to combine resolution results for multiple ER match results (each using the legacy framework) to identify a best person entity. These techniques continue to create critical "multiple persons" problems, that is, one entity with many resolved persons or many persons sharing a common resolved person.

SUMMARY

The present invention is directed to a system and method where, given an identity graph (or entity graph) where person entities are constructed from multiple asserted relationship records (PII and other attributes), a single authentication string that represents a person will resolve or identify the person in the graph whose composite information is closest to the input, that is, match the input with a person entity in the graph, by using all of the available context provided by the input string in an efficient and defensible manner. This authentication string is referred to herein as an asserted relationship (AR). By providing more contextual PII data to the match service, the service is able to match to a more focused and unique set of persons. In certain embodiments, the invention allows for the ability to take a small set of input data and more accurately identify its location in a significantly larger set of data (i.e., an identity graph) much faster in time and lower in computational cost, hence introducing the ability to stream data through a dynamically changing environment, in some implementations doing so in real time.

These and other features, objects and advantages of the present invention will become better understood from a consideration of the following detailed description of the preferred embodiments and appended claims in conjunction with the drawings as described following:

DRAWINGS

DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
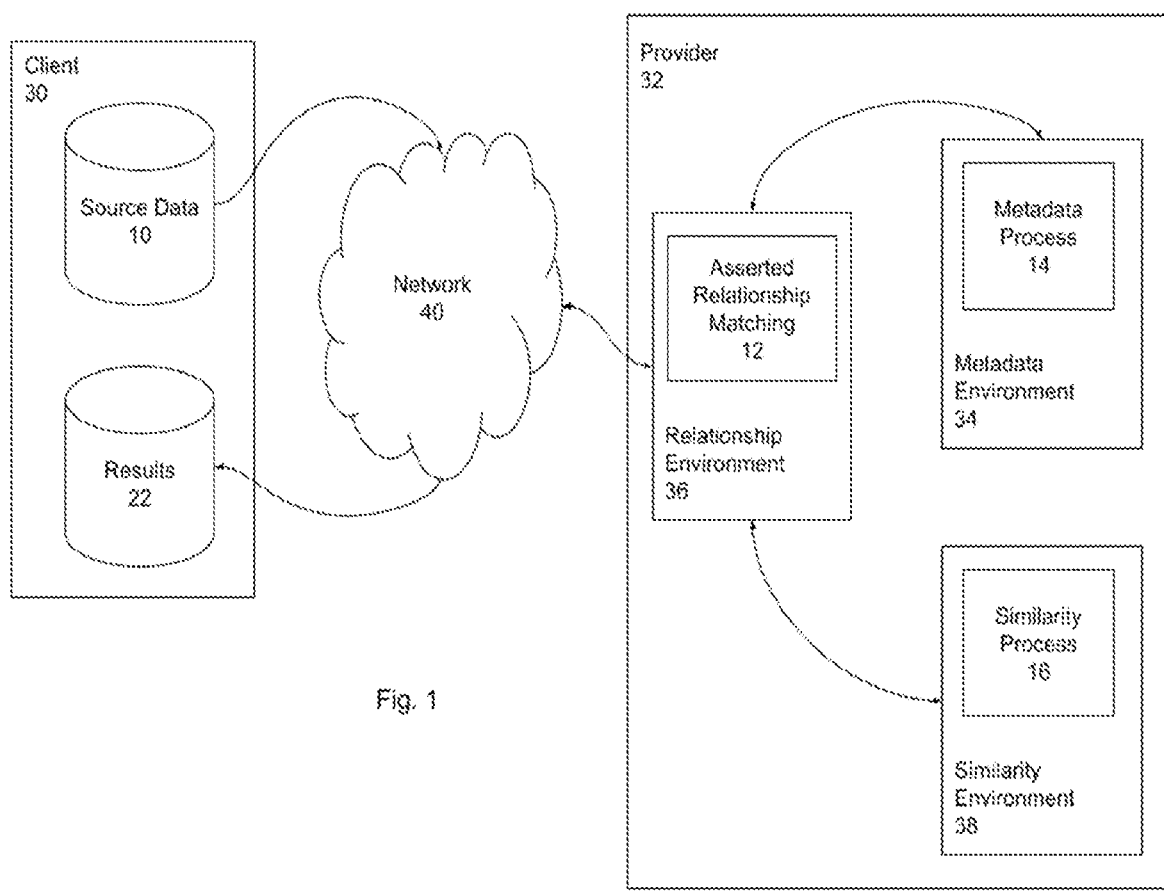
FIG. 1 is a structural diagram for hardware used in an implementation of the present invention.
Figure 2:
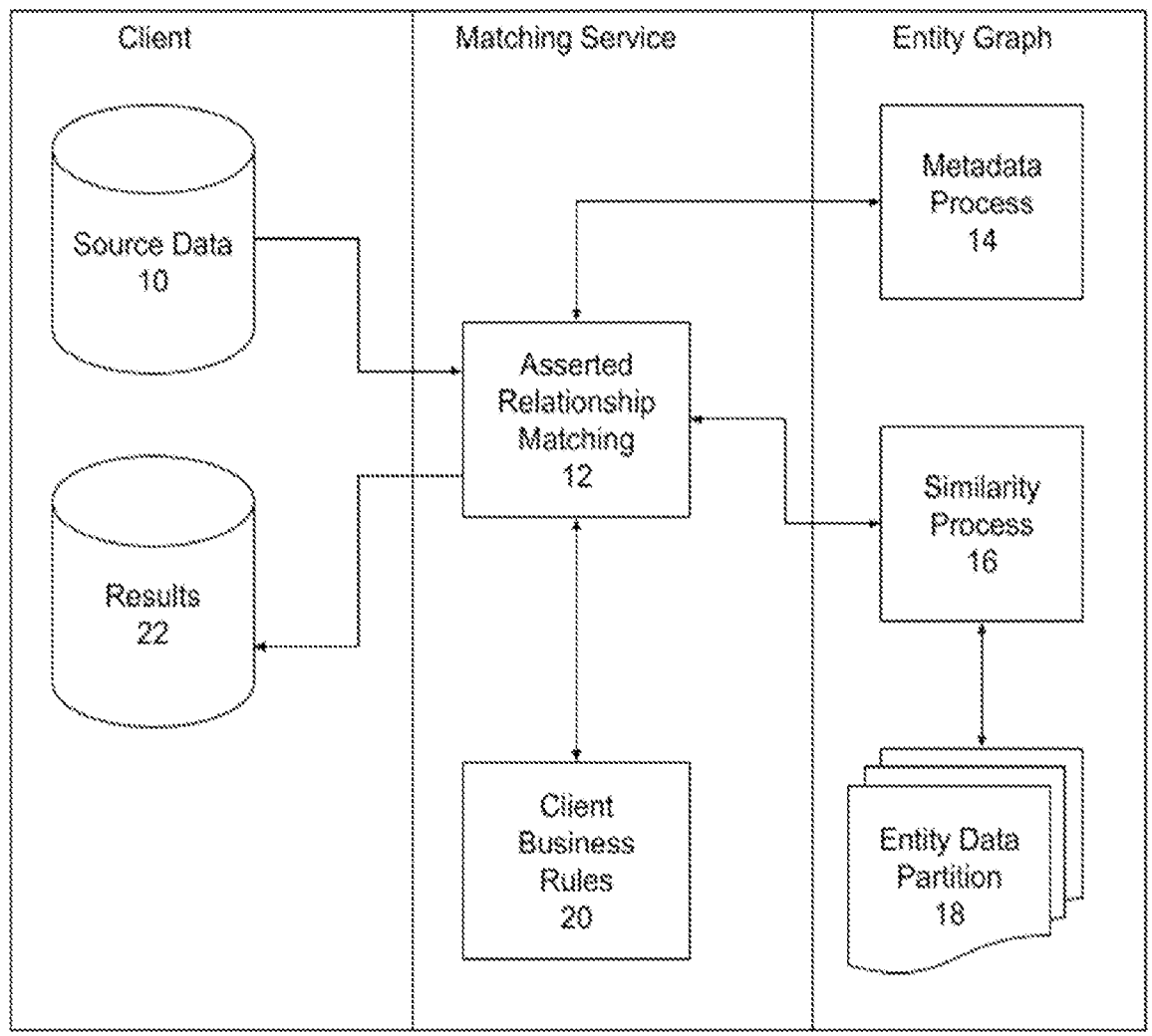
FIG. 2 is a swim lane diagram for processing steps according to an implementation of the present invention.
Figure 3:
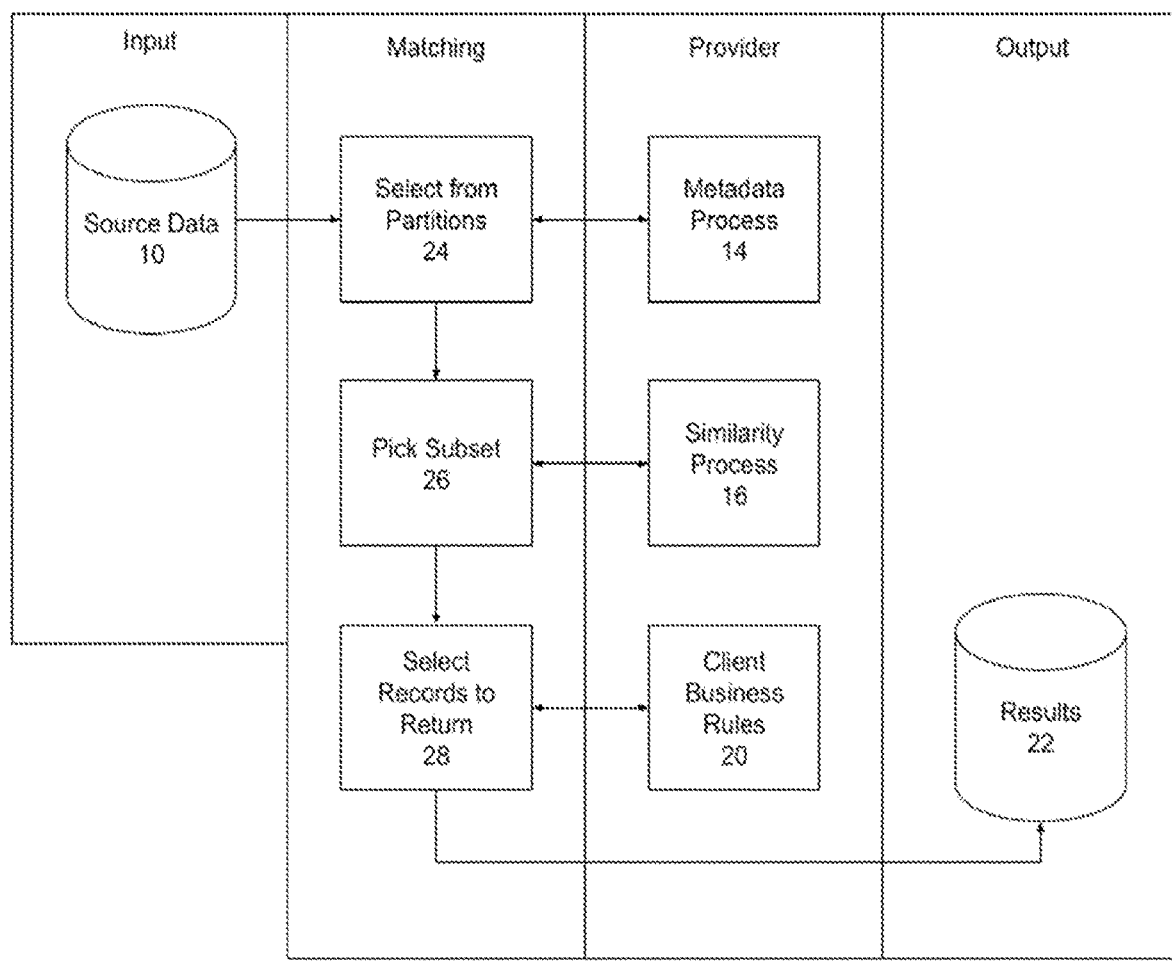
FIG. 3 is a swim lane diagram for the asserted relationship matching sub-steps according to an implementation of the present invention.

A method according to certain embodiments of the present invention may be described with respect to the overall swim lane diagram of FIG. 1. The swim lane diagram of FIG. 2 provides more detailed sub-steps with respect to the asserted relationship matching process 12 as shown in FIG. 1. Prior to employing the present invention, the construction of the persons in a resolution system according to certain embodiments of the invention requires the partitioning of the universe of the asserted data into disjoint significantly smaller subsets where each is self-contained in terms of defining the resulting persons. These partitions of the overall identity graph are shown at entity data partition 18. Each of these subsets within entity data partition 18 have membership criteria based on the members' personally identifiable information (PII). The framework metadata 14 for each partitioning set within entity data partition 18, as well as the appropriate references to the members of the set, form a component of the invention in certain embodiments as shown in FIG. 1. The matching service framework for this invention requires that the universe of persons be partitioned into subsets of similar persons from which one or several are chosen from which the match to the input data will be chosen. However, this partitioning must be done with the intent of forming sufficiently small subsets in order for cognitively expressive methods to be used efficiently to identify the person to be matched with the input authentication string.

There are significant differences between the partitioning of the initial universe of PII authentication strings for the construction of the persons and other entities in the entity data graph and the partitioning of the persons within the constructed entity graph for use in the asserted relationship (AR) matching algorithm. First unlike many entity resolution systems, each person can have many PII authentication strings that share little common overlap and hence the number of different name variations, postal addresses, phone numbers, email addresses and other PII information such as social security numbers, as these authentication strings come from a wide range of sources and contexts that many persons may choose to represent themselves quite differently. Although the PII authentication strings used to construct persons almost exclusively come from a common subset of the initial partitioning, persons who are strongly similar to each other can come from different partition subsets. A second difference is that multiple persons can and in fact do share large amounts of PII data across the different attribute fields. For example, two different persons can share a significant subset of attributes such as name, postal address, phone number, date of birth, email address and social security number within their defining set. As noted earlier, people often use relatives', friends', or purely bogus instances of PII attributes for different contexts from which source vendors collect and aggregate their data. Also, it is also not uncommon for a person to have tens of each of different name variations, postal addresses, phones, etc. Unfortunately, persons do not necessarily use the same touchpoint type instances for all (or even most) of their "actively used" authentication strings.

Therefore, the initial partitioning necessary for matching at a full AR or person level is based on the same partitioning context used in the construction of the persons in the building of the entity graph, but uses the formed persons as the basic contextual unit for similarity measures. To get partition elements roughly the same size and as "similarity closed" as possible with a reasonable person size for each, an emphasis is placed on each person's chosen most recent/"best" postal address in the process.

The actual construction of the partition within entity data partition 18 starts with the initial aggregation of persons sharing a "best" postal address and then expands to the use of other fields that provide a general "locality" context such as the postal city, state, and ZIP code from the (multiple) postal addresses, area codes from the provided phone numbers, local parts of email addresses, and name components. These form a similarity partition of potentially large subsets based on strict similarity criteria. For those resulting sets that are large in terms of persons and/or authentication strings that make up the persons, one or more additional iterations of the partitioning steps are run on them with a tightened locality context. This tightened context is a combination of restricted base locality (i.e., area code/exchange code, postal city/state/ZIP, etc.) as well as increasing the similarity requirements such as exact matches on sufficiently large subsets of attribute fields for the persons' defining PII.

When the iterations have converged to a single partitioning of the universe of persons, a feedback loop is then performed in terms of the defining similarity indices to determine whether a small number of adjustments to the partition elements in terms of strong person similarity across the partition boundaries is needed. This is needed as each time a portion of the universe has been subdivided into two or more disjoint components, persons who appeared very similar to multiple components but placed into one can look to be a better fit in a subdivision of another component that did not initially contain them. If so, such adjustments are made to the partitions within entity data partition 18, and the attribute indices for each partition element is recorded.

The next major contextual component is the matching service framework that takes in the external AR to be "matched" and then calls three consecutive support components in sequence. This element is shown in FIG. 1 as asserted relationship matching 18, and broken out into its constituent sub-steps in FIG. 2. These three sub-steps consist of the computation of the specific partition of the full universe in which to compare the input AR at step 24, the actual comparisons and aggregation of the results 26, and the match decision from the aggregate comparisons that determine both the strengths of the similarities and evidence of ambiguity of the similarities and makes the final match decision at step 28.

The determination of the match partition element involves the comparison of the attributes of the input authentication string to the partitioning indices at similarity process 16. Even with the noted ambiguity and obfuscation of the cognitive division of similar authentication strings relative to persons, a single index is clearly identified as the closest match to the authentication string. However, in case there is no single best match, there are two alternatives. The first is to deterministically and persistently choose a single index. The second is to return a subset of the equally strong match indices. In one implementation of this system all of the equally strong match indices are returned, and the maximum number of such return sets was three. Of course other values can be used in alternative embodiments of the invention.

The framework for the "comparisons" and "match decision" components uses the cognitive context of adding the input authentication string (AR) into each of the chosen indexed partition subsets and the person formations are recomputed within each subset, generating a small set of partition indices at metadata process 14. This re-computation of the persons in each subset uses a "top-down"

approach which is the role of the "comparisons" component. Rather than starting from scratch to reconstruct the "new" persons in each subset, the input AR is compared to each of the existing persons, and if that AR is sufficiently similar to be added to that person by use of the same criteria used for the rich contextual full graph construction it is noted as such. In case the AR is not similar enough to be potentially combined with an existing person it is thought to be a "new" person in that partition subset.

The cognitive framework to make the comparison between the input and each person in the partition subset at metadata process 14 decides not just in terms of only small subsets of the PII such as the previously noted entity representations, but rather considers a much wider context of the asserted person's PII and other attributes. However, as noted earlier, there are usually many different PII representations for a single person and it is frequent and normal behavior for persons to represent themselves with either obfuscated, false, and/or other (closely related persons') PII information. For example, a person often uses different variations of any one or more specific PII attributes in different situations such as purchasing a home or automobile versus signing up at a URL for free coupons or giveaways. Relative to an entity resolution system for marketing purposes many of these variations are important to know and be combined into a single person. Hence the set of ARs for one person often has ambiguous and non-static "boundaries" between her/him and multiple other persons.

When comparing the input authentication string to the persons in the chosen partition sets, the similarity process 16 uses exactly the same process as that used to define persons in the process to construct the entity resolution system's entity graph. Relative to the sense of the similarity of the different names, the "ordering" or "parsing" of the name components is ignored. It is not uncommon for a person to use different variations of their name components in different orderings. Also, it is very common to find first and middle initials used. Similarly, it is not uncommon for persons to use one or more nicknames and name variants. Attempts to standardize and/or hygiene these names fail and often bring additional ambiguity as there is extremely limited context when the interpretation is based solely on the name components of each AR independently. Similarly, postal addresses are also not assumed to be in a correct or anticipated format as well so that a direct comparison of such strings cannot be applied.

Next, when persons obfuscate a presented phone number it is primarily not just a random choice of digits, but rather replacing one or more of the area code, exchange code, and line number with a slightly altered or clearly bogus one, i.e. line number 0000, 9999, a special use or unused area code, directory assistance (555-1212), etc. The phone obfuscation also occurs by submitting a phone number of another person in the same household or relative/friend as well as a business number. If any of these first stated cases is identified for a phone number within a comparison between the input AR and one of the ARs defining a considered person, the degree of similarity of the ARs is not penalized by the phone comparison, but is logically considered to be a "blank" value. On the other hand, if it is determined that the phone number is associated with a different AR/person that shares the household containing the input AR, then the phone number acts as a complete phone match in the comparison. All other cases fall into the category of determining the different similarities and types of differences of the three phone components (area code, exchange code, and line number). For example, if the phone numbers share an area code and exchange code and the line number differs by a single digit or a switch of two consecutive digits then the similarity is quite strong. Similarly, if the exchange code and line number are the same and are not as noted above (clearly non-useful or invalid numbers) and the area code is different, the number are considered similar as it is not uncommon for persons moving to another location or needing a new phone number for a specific purpose to use the same non-area code seven digits. Also, sometimes asserted phone numbers have some of the last digits replaced by 'X' (often the line number or the last two digits of the line number). In these cases, the two phone numbers are considered similar enough to provide support for the similarity of the AR to persons comparisons.

Continuing, if age and/or year of birth is provided, a difference of no more than four years may signal a useful degree of evidence of AR similarity (the smaller the difference the stronger the evidence). If a full date of birth is provided in each AR being compared, the month/year portion of the date of birth carries the bulk of evidence for similarity. It is a common practice to obfuscate one's actual birth day by using the first of the month and also using January 1 as the month/day. For the instances of the latter case only the year is used if each of the month/day assertions of the ARs being compared is this common date (January 1) as it is the case that the January 1 variation is the most frequent for those who obfuscate their date of births this way.

If social security numbers and/or email addresses are provided, these can add evidence depending on the strength and type of the similarity of the above noted PII components. For example, if there is an exact match of these attributes this contributes to the similarity evidence in a very strong way (provided the social security number is not an obvious bogus one (e.g., 123-45-6789, 999-99-9999, etc.) or the email address is not an obvious bogus one (noname@noname.com) or a very common first or last name and a very common email domain (smith@gmail.com). However, these "common components" email addresses are used as obfuscated ones quite regularly and close relatives (parents, grandparents, children) sometimes share one or more of their social security numbers in different socioeconomic situations/transactions.

No similarity scoring mechanism is used at similarity process 16 to determine the final degree of similarity between the input AR and the person ARs being compared as the believability of the similarity of the AR, and the person does not depend on the independent individual component similarity only but rather also on the specific fields that show the greatest similarity strength as well as the use case preference of the entity resolution system. For example, a mother and daughter can share a common full name, postal address, phone number, email address, and have ages differing by 15+ years. On the other hand, if there is a common name, phone number, email address, social security number/age but a different postal address in the same state associated with the area code of the common phone number, then a much stronger claim can be made that the input AR is the same person being compared. Therefore, the decision as to whether the similarity is strong enough to combine the input AR with the compared person depends on context that is not captured by independent single attribute similarities.

Entity resolutions are of two general types, namely those that prefer "under-consolidations" and those that prefer "over-consolidations" in terms of the acceptable false positive and false negative ratios. However, in either of these cases it is sometimes important to initially "match" input ARs that do not completely align with those in the resolution system in the other context. When the entity resolution system is internally assessed in terms of potentially adding and/or removing a set of sources to the construction of the system, a significant component of this assessment is done by evaluating the evolutionary change to the system through means of using the match service. In these cases, there needs to be consistency in the balance between the construction of the data graph and this match process. On the other hand, this system allows for such adjustments to be made by changing the types of cases noted above to describe the desired contexts for strong matching criteria.

Finally, if none of the compared person's AR strongly matches the input AR, the above process is applied to the set of all touchpoint types and attributes provided by all of that person's ARs to find a potentially strong similarity. Since finding a strong similarity between the input AR and a single externally asserted AR is cognitively more defensible than a strong similarity by an aggregate view, then if there is not an extremely strong similarity comparison at a single AR level, both the best single AR match context (if one occurs) and the best aggregate similarity match context are collected to pass on to the "match decision" component.

As the addition of a single AR to a set of strongly similar persons often has greater impact than just a simple addition of the AR to a single person, the match decision component considers all defensible single additions of the AR to appropriate persons. It then measures this larger context to identify newly created ambiguities or significant implied changes to the existing graph structure. As the match service's jurisdiction does not extend to direct changes to the graph itself, but rather a best answer based on "if" the AR was to be added to the graph, the match decision must respond with a reply that is consistent and meaningful with the existing state of the graph. Also, in certain embodiments this invention allows for the client using the match service to designate specific business rules 20 that can impact both preferences in terms of emphasis on one or more different touchpoint types and the maximum number of persons to be returned in the decision process. These business rules 20 only apply to the persons already identified to be similar enough to the input AR to be consumed by them. Such rules can include whether the similarity level favors name and email exactness over postal and phone, an exact match to the input phone number is required, an AR to AR match is required, and in an example a maximum of five persons will be accepted for each input AR. If no such business rules 20 are provided, then at most a single person will be returned on the basis of the similarity profiles for each person given to the match decision component.

Moving to the actual decision process, if the AR was not added to any person in the partition subsets, then the AR is contextually a "new person" and this sub-component would respond with the decision that there is no person in the entity graph that the AR matches, and returns this as results 22. On the other hand, if there is only one person which consumed the input AR into itself, then this person is the unique match decision and will be returned as the match decision as long as it meets the specific business rules provided. The entire results 22 will be the results for each asserted person contained in source data 10.

When the input AR has been consumed within two or more persons that satisfy the client's business rules 20, if there is only one person that has an AR to AR strong match with the input, that is the person that is returned by this component. However, if there are more than the maximum number of allowed persons to include in the result, then there is a level of ambiguity that can be addressed in several ways.

If the input AR consists of a single touchpoint type instance (name, postal address, phone number, or email address) the input has very low granularity in that there is a very high probability that there will be multiple persons who share this instance. This will be true for any entity resolution system. In this case, if the clients wish to receive the identifier for a single person (or other entity such as a household) in order to preserve as much persistency/consistency as possible in an evolutionary system, a single "best" person is pre-decided and indexed for each touchpoint type instance in the data graph.

When the input AR consists of two touchpoint instances (primarily an asserted name and one other touchpoint type instance) the probability of multiple persons sharing this information does drop but is still quite high for the reasons stated above. This issue is approached in the same way as the single touchpoint type instance case, as is the case of an asserted name and two additional touchpoint type instances.

Continuing, to choose a "best" person and index the results for more than three touchpoint instances becomes exponentially greater to the point of a significant negative impact on the efficiency of both the construction of the data graph directly used by the match service as well as the lookup process during the decision making of the person to return. Most (if not all) of the entity resolution systems used primarily for marketing efforts address this issue by restricting the lens of the match service to only consider the "name+one different touchpoint type instance" or "name+two distinct touchpoint type instances" cases and use the indexing of a "best" person. However, for such entity resolutions this creates a major contextual problem. Consider the input JOHN SMITH, 235 N 23rd ST, NEW YORK NY 01234, 543-443-2100, JSMITH@GMAIL.COM. Using a name+single touchpoint type instance "lens," the match service discovers that there are twelve persons with the same name and postal address, so it uses the indexed "best" choice of person X. Similarly, there are four persons in the data graph that share the same name and phone number and thirty persons that share the same name and email address. The match service chooses person Y (different from X) for the name+phone match result and person Z for the name+email address match result. However, there is only one person in the entity data graph that matches the full input AR, in particular person W. Person W was in each of the sets of candidates for the three match decisions but was never chosen. Even if business specific rules are added to pick a "best" cumulative result from X, Y, and Z, the actual defensible best decision would not be found. As noted above, these types of cases occur more frequently than might be expected due to the nature of the universe of the available authentication strings available for marketing purposes, and the wide range of ARs that people use in different socio-economic contexts.

In order to address these larger contextual ARs (name+three or more touchpoint-type instances), the steps begin as in the previous cases. First, the candidates are filtered in terms of the client's business rules 20 and the number of persons whose similarity profile indicates an AR-to-AR match is identified. In case there are fewer candidates than the maximum number of acceptable persons in the business rules 20, then the result is straightforward. When there are more candidates than the maximum number of acceptable persons in the returned result, the system then attempts to order the candidates in such a way that there is a clear distinction between a subset of the candidates that are the strongest and whose size does not exceed the business specific requirements.

The ordering noted above is a partial ordering rather than a strict ordering. A strict ordering is one where the first-place entity is strictly better than the second-place entity, and so forth. However, for similarity measurement in these types of resolution systems there is no defensible strict ordering as there can be multiple persons whose similarity to the input AR are different in nature but equal in strength. Hence the partial ordering scheme of the first-place entity is not defensibly and consistently less than the second-place entity, etc. As a simple example, the partial ordering of the following arithmetic expressions based on their numerical result is "3+3", "3*2", "30/5", "4", "3+1", "10/5".

Hence the goal of the match decision component is to find such a partial ordering of the candidate persons so that there is a clear strict delineation in the partial order (a strict "better" step between two consecutive entries) so that the head of the list does not exceed the maximum allowed number of persons to be returned. In the vast majority of cases the straightforward review of the profiles of the candidate persons has such a clear delineation as noted and the return value is quickly determined. This ordering considers the client's specific similarities preferences.

The similarity ambiguity for input ARs with this many touchpoint-type instances to form the context for comparisons decreases exponentially to exceedingly low probabilities, and hence the number of cases where there are "too many" indistinguishable similarity persons is very rare. But in those cases, this invention in certain embodiments also has the similarity component return the number of different touchpoint-type and attribute instances found in all of the ARs that make up the person. These values are then used to measure the degree of expected obfuscation for each person. For example, a person with multiple asserted date of births and/or social security numbers, many phone numbers and/or email addresses, etc., is assumed to be a less defensible candidate for a meaningful return value than a person without such evidence of personal obfuscation.

Finally, if after this last filtering effort there are still too many persons in the smallest distinguishable set of "best" persons, several implementations are available. One implementation would return no person as a result, and a special identifier that separates this case from the "no match" result. Another implementation can be to return the best persons if their number exceeds the maximum allowable by a small amount, again clearly marking the results to identify this case. Yet another is to (randomly) choose an allowable number of persons to return. But in this case, if consistency/persistency is a valued trait of the match service the returned set needs to be indexed for that specific client so that future calls to the match service can preserve this trait.

In order for the invention to be efficient while performing more contextually complex decision-making on a large data graph (such as, for example, over 1.6B persons), a large and efficient computing environment must be available, preferably with sufficient in-memory capacity to contain the metadata 14 for the output of the results from the iterative formation of person entities. Also, there needs to be an efficient distributed computing system environment to provide sufficient parallelism for the actual comparisons of the match service and subsequent decisions to be made quickly.

FIG. 1 shows an architectural diagram for an implementation of the invention within a particular hardware framework. Within a client compute environment 30, source data 10 is stored, as well as an area for receiving results 22. The client compute environment 30 is connected to the provider compute network 32 by network 40, which may be the Internet. Provider compute environment 32 may, in certain embodiments, be a cloud computing environment. Metadata process 14, as previously described, may be implemented on a metadata distributed environment 34 using the Hadoop software package from Apache for manipulation of very large data sets. In a particular example, a metadata distributed environment may consist of 50 processing nodes with 200 GB of RAM memory. Similarity process 816 may be implemented on a similarity distributed environment 38, using the Apache Spark big data software environment, which is optimized for data parallelism and fault tolerance. It may be implemented, for example, using 100 processing nodes with 400 GB of RAM memory. Both metadata distributed environment 34 and metadata distributed environment 34 may be in communication with asserted relationship matching process 12 implemented on asserted relationship matching environment 36. It may also be implemented as a Spark environment, with 50 processing nodes and 200 GB of RAM memory in a particular example.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system's memory capabilities may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A system for asserted relationship matching, comprising:
  an entity graph, wherein the entity graph comprises data structures each pertaining to an entity and comprising touchpoints corresponding to such entity, and wherein the entity graph is partitioned into a plurality of entity data partitions, wherein each entity data partition comprises data structures pertaining to similar entities, wherein similarity of the data structures is initially determined by aggregating entities sharing a best postal address; and
  an asserted relationship matching service, configured to:
    receive a source data comprising at least one authentication string corresponding to an entity;
    perform a metadata process to compare the asserted authentication string to at least one of the plurality of entity data partitions to identify a subset of the entity data partitions in which an entity matching the authentication string is contained by re-computation of entities in each subset of the entity data partitions using the authentication string to generate a set of partition indices and determine if the authentication string is sufficiently similar to be added to each of the data partitions in the subset;
    for each entity in each of the subset of the entity data partitions, perform a similarity process to identify a set of matching profiles for the authentication string from within the subset of the entity data partitions;
    apply a set of client business rules to the set of matching profiles to identify at least one matching profile from within the set of matching profiles that matches the authentication string; and
    return a result for the authentication string.

2. The system of claim 1, wherein similarity of the data structures is further determined by aggregating entities sharing a general locality context.

3. The system of claim 2, wherein similarity of the data structures is further determined by aggregating entities sharing a tightened locality context and by exact matching on subsets of attribute fields for the entities.

4. The system of claim 1, wherein performing the metadata process further comprises the substitution of a blank value for a telephone number in the case of the telephone number corresponding to a false number, without applying a penalty for the similarity determination.

5. The system of claim 1, wherein applying the set of client business rules comprises construction of a partial ordering of candidate entities based on likelihood of match.

6. A system for identifying an entity, comprising:
  one or more processors; and
  a memory space having instructions stored therein, the instructions, when executed by the one or more processors, causing the processors to perform operations comprising:

receiving a source data comprising at least one authentication string corresponding to an entity;

performing a metadata process comprising the comparison of the asserted authentication string to at least one of a plurality of entity data partitions to identify a subset of the entity data partitions in which an entity matching the authentication string is contained by re-computation of entities in the subset using the authentication string to generate a set of partition indices and determine if the authentication string is sufficiently similar to be added to the subset;

for each entity in each of the subset of the entity data partitions, performing a similarity process to identify a set of matching profiles for the authentication string from within the subset of the entity data partitions;

applying a set of client business rules to the set of matching profiles to identify at least one matching profile from within the set of matching profiles that matches the authentication string; and returning a result for the authentication string.

7. The system of claim 6, further comprising an entity graph comprising data structures each pertaining to an entity and comprising touchpoints corresponding to such entity, and wherein the instructions, when executed by the one or more processors, cause the processors to partition the entity graph into the plurality of entity data partitions, wherein each entity data partition comprises data structures pertaining to similar entities, wherein whether entities are similar is initially determined by aggregating entities sharing a best postal address.

8. The system of claim 7, wherein whether entities are similar is further determined by aggregating entities sharing a general locality context.

9. The system of claim 8, wherein whether entities are similar is further determined by aggregating entities sharing a tightened locality context and by exact matching on subsets of attribute fields for the entities.

10. The system of claim 6, wherein performing the metadata process further comprises the substitution of a blank value for a telephone number in the case of the telephone number corresponding to a false number, without applying a penalty for the similarity determination.

11. The system of claim 6, wherein applying the set of client business rules comprises construction of a partial ordering of candidate entities based on likelihood of match.

12. A method for matching an authentication string to an entity within an entity graph, the method comprising:

receiving the authentication string corresponding to an entity from a client process;

performing a metadata process comprising the comparison of the asserted authentication string to at least one of a plurality of entity data partitions to identify a subset of the entity data partitions in which an entity matching the authentication string is contained by re-computation of entities in the subset of entity data partitions using the authentication string to generate a set of partition indices and determine if the authentication string is sufficiently similar to be added to the subset of the entity data partitions;

for each entity in each of the subset of the entity data partitions, performing a similarity process to identify a set of matching profiles for the authentication string from within the subset of the entity data partitions;

applying a set of client business rules to the set of matching profiles to identify at least one matching profile from within the set of matching profiles that matches the authentication string; and returning a result for the authentication string.

13. The method of claim 12, further comprising the step of partitioning an entity graph into the plurality of entity data partitions, wherein each entity data partition comprises data structures pertaining to similar entities, wherein whether entities are similar is initially determined by aggregating entities sharing a best postal address.

14. The method of claim 13, wherein whether entities are similar is further determined by aggregating entities sharing a general locality context.

15. The method of claim 14, wherein whether entities are similar is further determined by aggregating entities sharing a general locality context.

16. The method of claim 12, wherein performing the metadata process further comprises the substitution of a blank value for a telephone number in the case of the telephone number corresponding to a false number, without applying a penalty for the similarity determination.

17. The method of claim 12, wherein applying the set of client business rules comprises construction of a partial ordering of candidate entities based on likelihood of match.

* * * * *